United States Patent [19]

Herr

[11] Patent Number: 4,582,021

[45] Date of Patent: Apr. 15, 1986

[54] UNIVERSAL SANITARY TRAP

[75] Inventor: Warren E. Herr, Hasbrouck Heights, N.J.

[73] Assignee: Alfa-Laval, Inc., Poughkeepsie, N.Y.

[21] Appl. No.: 648,048

[22] Filed: Sep. 7, 1984

[51] Int. Cl.⁴ .............................................. A01J 9/06
[52] U.S. Cl. ................................ 119/14.05; 119/14.46
[58] Field of Search ........................... 119/14.05, 14.46

[56] References Cited

U.S. PATENT DOCUMENTS

| 1,972,144 | 9/1934 | Hapgood | 119/14.46 X |
| 2,237,444 | 4/1941 | McCornack | 119/14.46 X |
| 3,116,714 | 1/1964 | Bender | 119/14.05 X |

FOREIGN PATENT DOCUMENTS 7707596  6/1978  Netherlands ...................... 119/14.05

Primary Examiner—Robert P. Swiatek

Attorney, Agent, or Firm—Cyrus S. Hapgood

[57] ABSTRACT

A trap chamber is formed by a cylindrical container and a head sealed to and closing the upper end of the container, which is releasable from the head by actuating a detent. Air and entrained liquid from a milk receiver are sucked into the head through a tangential inlet from which air discharges through a top outlet to a vacuum pump while separated liquid spirals down along the chamber wall to a valved drain outlet. Liquid accumulating in the chamber eventually raises a floating ball valve against a seat to close the air outlet and break the vacuum so that the chamber is drained through the bottom outlet. The ball valve is then released from its seat by an element operable to break the vacuum in the air outlet. Vacuum in the chamber draws the container upward to compress a sealing gasket against the head and thus prevent leakage.

10 Claims, 3 Drawing Figures

UNIVERSAL SANITARY TRAP

This invention relates to sanitary traps installed in vacuum milking systems between the milk receiver and the vacuum pump to prevent entrained liquid from reaching the pump.

BACKGROUND OF THE INVENTION

Heretofore, sanitary traps have been sized according to the size of the milk receiver; i.e., small traps have been used with small receivers, while large receivers have required large traps. This limits production quantities for any one size, resulting in higher costs and the need to stock different sizes.

BRIEF SUMMARY OF THE INVENTION

The present invention provides a universal size trap which can be used with both small and large milk receivers.

The invention comprises means forming a generally cylindrical trap chamber having at its upper part an inlet through which the air and entrained liquid enter, preferably tangentially, and also an air outlet through which separated air discharges to the vacuum pump. In response to a vacuum initially created in the chamber, a valve member automatically closes a bottom drain outlet, and liquid separated from the air entering the chamber accumulates at the bottom. As the liquid level rises in the chamber, a float rises to a position where it closes the air outlet to break the vacuum so that the chamber drains through its bottom outlet. The float is then released from its raised position by an element operable to temporarily break the vacuum in the air outlet itself. This causes the float to drop to the bottom again so that the operation can be repeated. The position of the element is then reversed to restore the chamber vacuum.

In the preferred trap, the chamber-forming means include a cylindrical container and a head releasably secured to the container to close its upper end; and the inlet, air outlet and vacuum-breaking element are carried by the head. Preferably, retaining means are mounted on the head and underlie an outwardly extending, annular rim of the container to suspend it from the head, the retaining means including a detent movable outwardly from under the rim to release the container. An annular gasket is preferably interposed between the rim and an overlying surface of the head, and the chamber vacuum acts to urge the container upwardly relative to the head and thereby compress the gasket to effect a good seal against leakage.

THE DRAWINGS

For a more complete understanding of the invention, reference may be had to the following description in conjunction with the accompanying drawings illustrating a preferred form of the new trap. In the drawings.

DETAILED DESCRIPTION

Figure 3:
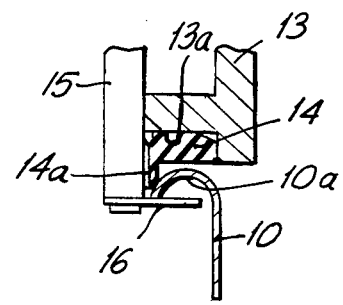
FIG. 3 is an enlarged detail view of parts of the trap.

The trap as illustrated comprises a cylindrical container part 10 open at both ends and having at its upper end an outwardly extending annular rim 10a which is arched in cross-section (FIG. 3). At its lower end, the part 10 has an inwardly extending annular rim 10b. A bottom 11 is formed by a cylindrical insert 11a which fits tightly against the inner wall of part 10 to which it is secured. Bottom 11 is generally conical and slopes downward to a central opening 11b constituting a liquid drain outlet. On its upper surface, the bottom 11 has radial wings 11c spaced around central opening 11b.

Figure 1:
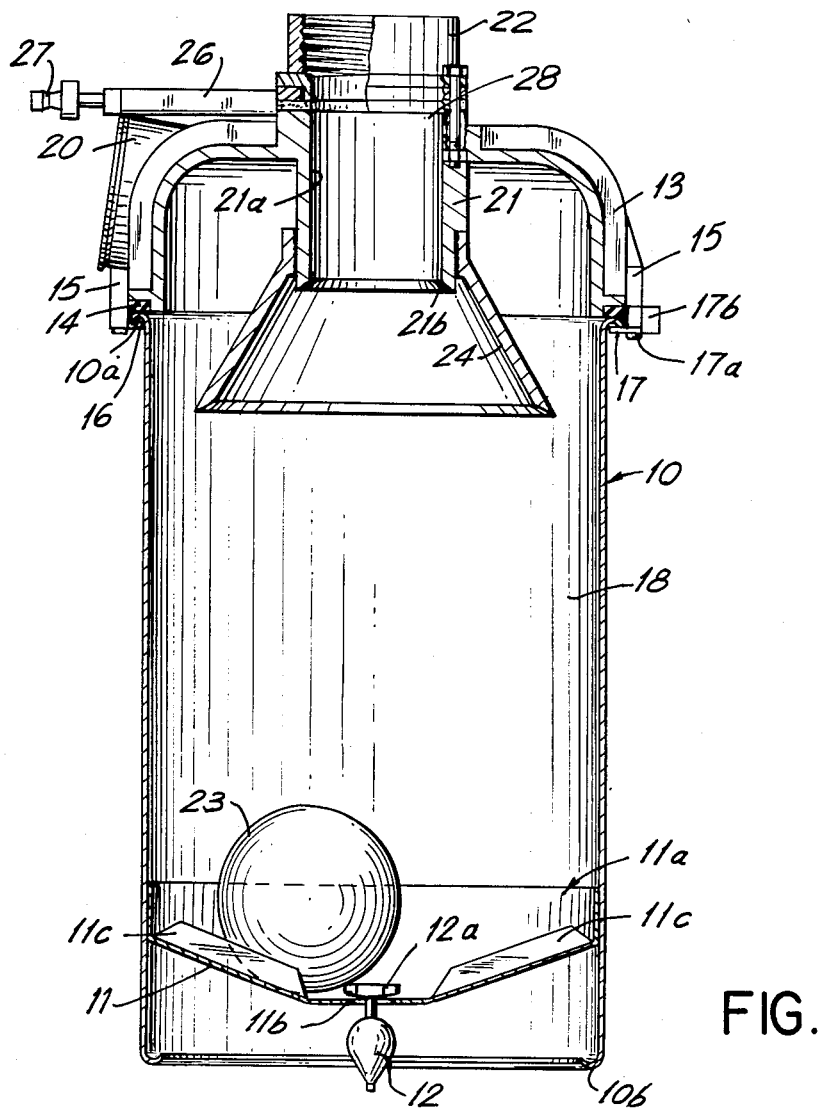
FIG. 1 is a vertical sectional view, partly in elevation, of the trap.

A plug valve 12 is supported below outlet opening 11b by a retainer 12a. The latter is normally held by gravity against the upper surface of bottom 11 so that plug 12 is spaced from the bottom to allow liquid to drain through opening 11b (FIG. 1). However, when a vacuum is created in container 10–11, the upward rush of air through the opening 11b lifts 12 against bottom 11 to close the opening, the vacuum holding the plug in its closing position. As shown, plug 12 is in the shape of a tear-drop, this shape serving aerodynamically to insure rapid movement of the plug to its closing position when the vacuum is initiated. This shape also limits splashing as liquid drains through opening 11b when plug 12 drops to its open position.

The container or pail 10–11, which may be made of thin metal, is closed at its upper end by a hollow, round head 13. An annular gasket 14 is interposed between the curved upper surface of pail rim 10a and a flat annular surface 13a at the lower end of head 13, the latter surface partly defining a recess for the gasket (FIG. 3). A skirt 14a extents downward from the outer edge of the gasket and contacts the outer part of rim 10a (FIG. 3).

Figure 2:
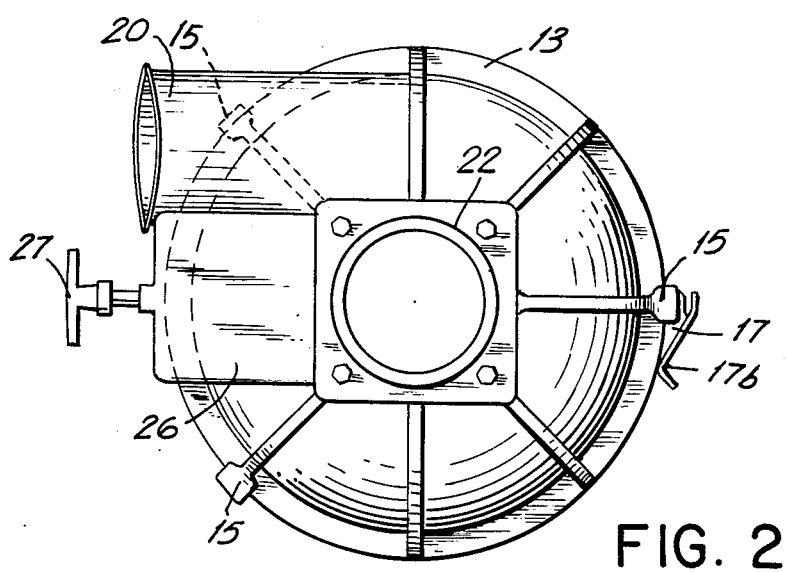
FIG. 2 is a plan view of the trap.

At its outer portion, head 13 has three support elements 15 spaced around the head (FIG. 2). Fixed detents 16 are secured to the lower ends of two elements 15 and project inwardly under pail rim 10a. A movable detent 17 is secured to the lower end of the third support element 15 by a screw 17a. The latter forms a pivot on which the movable detent can be retracted outwardly by handle 17b from its locking position under rim 10a.

With detent 17 in its retracted position, the adjacent edge of pail rim 10a can be lowered by tilting the pail, whereby the pail can be easily detached from head 13 by moving the pail in the direction (to the right in FIG. 1) to withdraw its rim 10a from above the fixed detents 16. Conversely, the pail can be readily mounted by inserting its rim 10a between detents 16 and gasket 14 and then adjusting the pail so that detent 17 can be swung inwardly under the rim. The pail when thus mounted forms with head 13 a trap chamber 18.

As shown in FIGS. 1 and 2, head 13 has a tangential inlet 20 which is adapted for connection to a milk receiver (not shown). The head also has a depending tube 21 forming a central air outlet 21a and a valve set 21b at the entrance to the air outlet. Through a fitting 22 secured to the top of head 13, the air outlet is adapted for connection to a vacuum pump (not shown).

Chamber 18 contains a free-floating ball valve 23 and an upwardly tapering guide cone 24 secured to outlet tube 21. As shown in FIG. 1, cone 24 has a conical wall which is imperforate. Head 13 is provided at its upper portion with a housing 26 for a horizontally movable valve member (not shown). By means of an operating handle 27, this valve member can be moved inwardly between the lower end of fitting 22 and the annular upper end 28 of outlet tube 21, thereby cutting off communication between outlet 21a and the vacuum pump.

To prepare the trap for operation, inlet 20 is connected to the milk receiver, and fitting 22 is connected to the vaccum pump, thus supporting the head 13 which in turn supports pail 10. With the parts as shown in FIG.

1 and the vacuum pump turned on, the resulting vacuum in chamber 18 raises plug 12 to close drain outlet 11b, the ball 23 being too light to prevent this action. Air with entrained liquid is then drawn from the milk receiver and enters the chamber through tangential inlet 20, which gives the air a swirling movement to facilitate separation of the liquid therefrom. As the air discharges through outlet 21a, separated liquid will spiral downward and accumulate in the chamber's lower part. The liquid will encounter the radial wings 11c which arrest the rotation to facilitate draining of chamber 18.

Whenever the liquid level rises sufficiently, ball float 23 enters the lower end of cone 24 and is guided by it against seat 21b, thereby closing air outlet 21a. As a result, the vacuum in the chamber is broken and the chamber completely drains through bottom outlet 11b. Thereafter, valve handle 27 is operated to cut off communication between the vacuum pump and the upper end of tube 21 and break the vacuum in outlet 21a. Ball float 23 is thus released from its seat and falls to the bottom of the chamber. The milking system can then be restarted after handle 27 is operated to re-open communication with the vacuum pump.

Prior to creation of the vacuum in chamber 20, the gasket skirt 14a bears against the outer part of pail rim 10a (FIG. 3), thereby initially sealing against leakage as the vacuum starts to build up. The vacuum then acts to draw the pail upward relative to head 13 so that the main body of the gasket is compressed between rim 10a and the head to form a strong seal.

I claim:

1. A sanitary trap for milking systems, which comprises means forming a generally cylindrical trap chamber having at its upper end part an air and liquid inlet adapted for connection to a milk receiver, the chamber also having at said upper end part an air outlet adapted for connection to a vacuum pump, a valve seat defining an entrance to said air outlet, said chamber also having a bottom outlet for draining trapped liquid from the chamber, a valve member normally opening said bottom outlet but movable to close the same in response to creation of a vacuum in said chamber, a float in the chamber coacting with said valve seat and floatable to a raised position to close said air outlet in response to accumulation of liquid in the chamber, thereby breaking said vacuum and draining the chamber through said bottom outlet while the float is held in its raised position by a vacuum in said air outlet, and an element operable to break the vacuum in said air outlet, thereby releasing said float from its raised position.

2. The trap of claim 1, in which said valve member is normally held by gravity in an opening position and includes a plug movable upwardly to close said bottom outlet in response to said vacuum in the chamber.

3. The trap of claim 1, in which said inlet is directed tangentially into said chamber to cause rotation of the liquid as it streams downward toward said bottom outlet, and means in the lower portion of the chamber for arresting said rotation upstream from the bottom outlet.

4. The trap of claim 1, in which said float is a free-floating ball valve, the trap comprising also a member in said chamber tapering upward toward said valve seat to guide the ball valve against the seat.

5. The trap of claim 4, in which said upwardly tapering member has an imperforate conical wall surrounding a free space dimensioned to receive the upper part of said ball valve.

6. The trap of claim 1, in which said chamber-forming means include a cylindrical container and a head releasably secured to the container to close its upper end, said inlet, valve seat, air outlet and vacuum-breaking element being carried by said head.

7. The trap of claim 6, in which said container has an outwardly extending annular rim at its upper end, the head having a lower portion surrounding said rim and provided with a downwardly facing annular surface overlying the rim, the trap comprising also retaining means mounted on said surrounding lower portion and underlying said rim to suspend the container from the head, said retaining means including a detent movable outwardly from under the rim to release the container from the head, and an annular gasket interposed between said rim and overlying surface and operable to seal said chamber against leakage between the head and container.

8. The trap of claim 7, in which the gasket is secured to the head and has a depending annular skirt engaging the outer part of the container rim, the gasket also having a surface overlying the rim above the level of said skirt and against which the rim is drawn by the action of a vacuum in said chamber.

9. The trap of claim 8, in which said valve member is normally held by gravity in an opening position and includes a plug movable upwardly to close said bottom outlet in response to said vacuum in the chamber, said inlet being directed tangentially into the chamber to cause rotation of the liquid as it streams downward toward said bottom outlet, the trap comprising also means in the lower portion of the chamber for arresting said rotation upstream from the bottom outlet, said float being a free-floating ball valve, and a member in said chamber tapering upward toward said valve seat to guide the ball valve against the seat.

10. The trap of claim 1, in which the trap chamber constitutes the only connection through which said liquid inlet communicates with said bottom outlet.

* * * * *